(12) United States Patent
Feldman et al.

(10) Patent No.: US 12,561,544 B2
(45) Date of Patent: Feb. 24, 2026

(54) DYNAMIC QUICK-RESPONSE CODES (QR CODES) FOR ELECTRIC VEHICLE (EV) CHARGERS THAT ARE USED FOR CONFIGURATION/COMMISSIONING OR OPERATION AT DIFFERENT POINTS IN TIME

(71) Applicant: Siemens Industry, Inc., Alpharetta, GA (US)

(72) Inventors: Daniel Feldman, New York, NY (US); Marlene Biehl, Atlanta, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 101 days.

(21) Appl. No.: 18/664,409

(22) Filed: May 15, 2024

(65) Prior Publication Data

US 2025/0356154 A1 Nov. 20, 2025

(51) Int. Cl.
*G06F 1/24* (2006.01)
*B60L 53/30* (2019.01)
*B60L 53/68* (2019.01)
*G06F 9/4401* (2018.01)
*G06K 19/06* (2006.01)

(52) U.S. Cl.
CPC ...... *G06K 19/06037* (2013.01); *B60L 53/305* (2019.02); *B60L 53/68* (2019.02); *G06F 9/4401* (2013.01); *G06F 9/4406* (2013.01)

(58) Field of Classification Search
CPC . G06K 19/06037; B60L 53/305; B60L 53/68; G06F 9/4401

USPC .............................................................. 713/2
See application file for complete search history.

(56) References Cited

U.S. PATENT DOCUMENTS

| | | | |
|---|---|---|---|
| 11,376,981 B2* | 7/2022 | Lee | B60L 53/64 |
| 2014/0266047 A1* | 9/2014 | Robers | H02J 13/00024 |
| | | | 320/109 |
| 2018/0215280 A1* | 8/2018 | Lee | B60R 25/23 |
| 2019/0061688 A1* | 2/2019 | Watanabe | G05D 1/81 |
| 2020/0006969 A1* | 1/2020 | Penilla | H04L 67/04 |
| 2021/0031947 A1* | 2/2021 | Wankewycz | B60L 53/51 |
| 2021/0213846 A1* | 7/2021 | Sun | B60L 58/12 |
| 2022/0242267 A1* | 8/2022 | Wang | B60L 53/65 |
| 2022/0281336 A1* | 9/2022 | Rodriguez Romero | |
| | | | B60L 53/37 |
| 2022/0366418 A1* | 11/2022 | Melcer | G06Q 20/326 |
| 2022/0379763 A1* | 12/2022 | Kydd | B60L 53/64 |

(Continued)

*Primary Examiner* — Volvick Derose

(57) ABSTRACT

A system comprises an Electric Vehicle (EV) charger with an electronic display screen having an e-ink/e-paper display—a technology that allows displaying information without power and an Open Charge Point Protocol (OCPP) backend system that receives charging data and sends charging commands based on dynamic load management principles via communication between chargers and central back-end EV charging management systems. The system further comprises a first dynamic Quick-Response code (QR code) representing the EV charger for the purposes of charger commissioning and configuration is presented on the e-ink/e-paper display during a boot time, and during (re-) configuration time whenever the EV charger is placed in a (re-)configuration mode and a second dynamic QR code different from the first dynamic QR code related to the OCPP backend system to which the EV charger is connected is presented on the e-ink/e-paper display during an operational time.

20 Claims, 4 Drawing Sheets

(56)                         References Cited

U.S. PATENT DOCUMENTS

| 2024/0092212 A1* | 3/2024 | Burton | B60L 53/665 |
| 2024/0198827 A1* | 6/2024 | Vicari | B60L 53/30 |

* cited by examiner

Operational time (after the charger completes its boot, plus configurable delay time, for the purposes of allowing the charger to be configured/installed for a longer period)

Electric Vehicle Charger    507

Screen    515    505

QR Code equivalent to the URL used by drivers, that allow them to access an operations screen presented by the OCPP server to which the charger is connected. In this example: https://OCPPServerURL.com/ABCD1234567890

FIG. 5

Boot time or when the charger is powered off (for chargers with an eInk display)

Electric Vehicle Charger    407

Screen    415    405

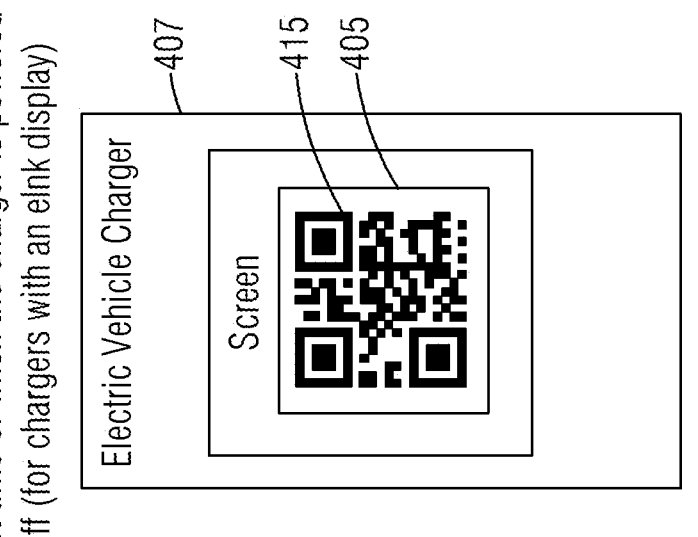

QR Code equivalent to charger serial number, in this example: ABCD1234567890

FIG. 4

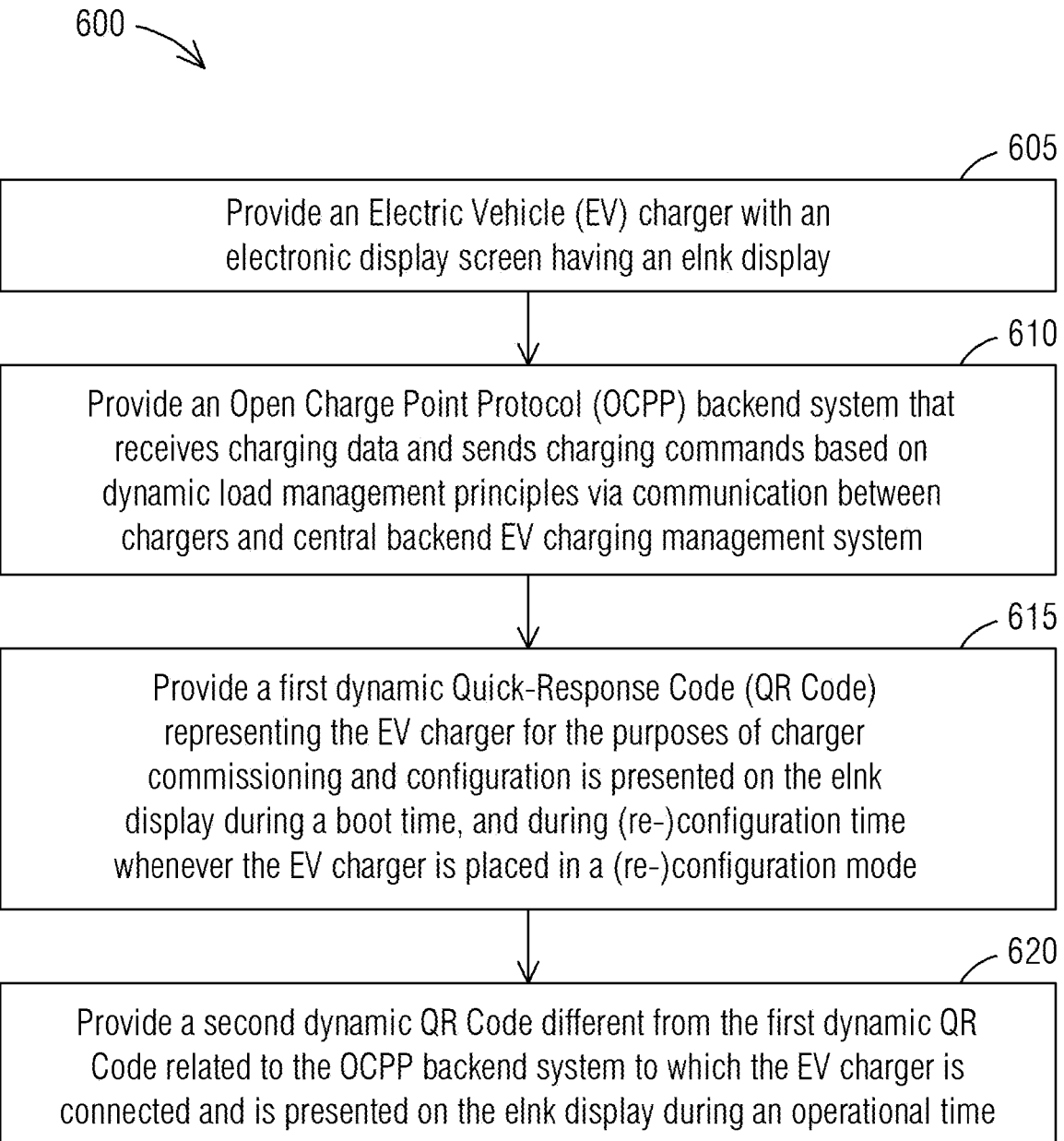

600

605

Provide an Electric Vehicle (EV) charger with an
electronic display screen having an eInk display

610

Provide an Open Charge Point Protocol (OCPP) backend system that
receives charging data and sends charging commands based on
dynamic load management principles via communication between
chargers and central backend EV charging management system

615

Provide a first dynamic Quick-Response Code (QR Code)
representing the EV charger for the purposes of charger
commissioning and configuration is presented on the eInk
display during a boot time, and during (re-)configuration time
whenever the EV charger is placed in a (re-)configuration mode

620

Provide a second dynamic QR Code different from the first dynamic QR
Code related to the OCPP backend system to which the EV charger is
connected and is presented on the eInk display during an operational time

FIG. 6

DYNAMIC QUICK-RESPONSE CODES (QR CODES) FOR ELECTRIC VEHICLE (EV) CHARGERS THAT ARE USED FOR CONFIGURATION/COMMISSIONING OR OPERATION AT DIFFERENT POINTS IN TIME

BACKGROUND

1. Field

Aspects of the present disclosure generally relate to dynamic Quick-Response codes (OR codes) for Electric Vehicle (EV) chargers that are used for configuration/commissioning or operation at different points in time.

2. Description of the Related Art

OR codes are normally used to identify Electric Vehicle chargers. These can be static, printed on paper, dynamic, or displayed on an LCD screen. Static OR codes have the advantage of being usable for always identifying the EV charger, regardless of which Open Charge Point Protocol (OCPP) backend the EV charger is connected to. On the other hand, static OR codes have the disadvantage of being susceptible to being covered by a malicious agent, who can then use the OR code to attack a driver trying to charge her/his vehicle. They are also prone to physical damage through environmental influences when installed outdoors thus making them not scannable. Dynamic OR codes have the advantage of being harder to hack via placement of a paper OR code on top, but have the disadvantage of changing every time they are present, based on which backend the EV charger is connected to. This poses a problem for using the dynamic OR code in order to identify the EV charger during (re-)configuration time, when no backend may be associated with the EV charger (and therefore no OR code is present), or after the backend is configured to the EV charger, because at that point the OR code is created by the backend, and not the platform used to configure the EV charger.

Thus far, two different OR codes have been placed on the EV charger, one static, with the physical permanent identification of the EV charger (still susceptible to be hacked) and a different one for operation with a backend (either dynamic or static). Having two OR codes can serve as an additional source of confusion for an end user and service personnel, who does not know which one to necessarily used for what.

Therefore, a system is then needed to provide proper identification of an EV charger during both configuration/commissioning or operation times.

SUMMARY

Briefly described, aspects of the present disclosure relate to providing proper identification of an EV charger during both configuration/commissioning or operation times. Two dynamic Quick-Response codes (OR codes) are provided for Electric Vehicle (EV) chargers that are used for configuration/commissioning or operation at different points in time. In an EV charger with an electronic display screen, a dynamic OR code representing the EV charger for the purposes of charger commissioning and configuration is presented during a boot time, and whenever the EV charger is placed in a configuration mode. In any other situation, a dynamic OR code presented is related to the OCPP backend to which the EV charger is connected. If the screen used in the charger is an e-ink or an electronic paper (e-paper) screen, when power is out the EV charger commissioning/configuration OR code is displayed on the screen. This removes the utilization of paper OR codes, which are inherently insecure. Avoids confusion of both an end user as well as a service personnel operating and servicing the EV charger. This solution uses a single dynamic OR code, on a screen, to replace all other OR codes in the EV charger or has a variable OR code on a screen that is used for configuration/commissioning or operation at different points in time.

In accordance with one illustrative embodiment of the present disclosure, a system comprises an Electric Vehicle (EV) charger with an electronic display screen having an e-ink display and an Open Charge Point Protocol (OCPP) backend system that receives charging data and sends charging commands based on dynamic load management principles via communication between chargers and central back-end EV charging management systems. The system further comprises a first dynamic Quick-Response code (QR code) representing the EV charger for the purposes of charger commissioning and configuration is presented on the e-ink display during a boot time, and during (re-)configuration time whenever the EV charger is placed in a (re-)configuration mode and a second dynamic OR code different from the first dynamic OR code related to the OCPP backend system to which the EV charger is connected is presented on the e-ink display during an operational time.

In accordance with one illustrative embodiment of the present disclosure, a method is provided which comprises providing an Electric Vehicle (EV) charger with an electronic display screen having an e-ink display and providing an Open Charge Point Protocol (OCPP) backend system that receives charging data and sends charging commands based on dynamic load management principles via communication between chargers and central back-end EV charging management systems. The method further comprises providing a first dynamic Quick-Response code (QR code) representing the EV charger for the purposes of charger commissioning and configuration is presented on the e-ink display during a boot time, and during (re-)configuration time whenever the EV charger is placed in a (re-)configuration mode and providing a second dynamic OR code different from the first dynamic OR code related to the OCPP backend system to which the EV charger is connected is presented on the e-ink display during an operational time.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

FIG. 4 illustrates a first dynamic OR code in accordance with an embodiment of the present disclosure.

FIG. 5 illustrates a second dynamic OR code in accordance with an embodiment of the present disclosure.

FIG. 6 illustrates a method of providing two distinct dynamic OR codes on a screen of an EV charger in accordance with an embodiment of the present disclosure.

DETAILED DESCRIPTION

Figure 1:
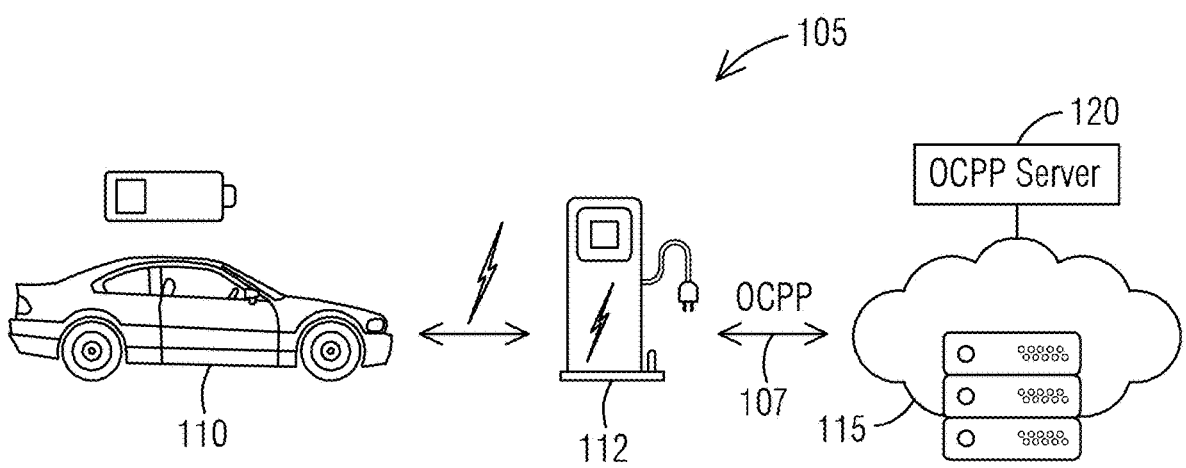
FIG. 1 illustrates an Open Charge Point Protocol (OCPP) that enables communication between an electric vehicle (EV), a charge point (EV Charger), and an OCPP backend system in accordance with an embodiment of the present disclosure.

Various technologies pertain to systems and methods that provide two distinct dynamic OR codes on a screen of an EV charger. The first dynamic OR code is equivalent to a charger serial number in a format ABCD1234567890. The second dynamic OR code is equivalent to a URL (https://OCPPServerURL.com/ABCD1234567890) used by drivers. There are two different states: the EV charger is booting and the EV charger is no longer booting, and now is ready for operation. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

To facilitate an understanding of embodiments, principles, and features of the present disclosure, they are explained hereinafter with reference to implementation in illustrative embodiments. In particular, they are described in the context of dynamic OR codes for EV chargers. Embodiments of the present disclosure, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

These and other embodiments of the system are provided for providing dynamic QR codes for EV chargers according to the present disclosure are described below with reference to FIG. 1 herein. The drawing is not necessarily drawn to scale.

Consistent with an embodiment of the present disclosure, FIG. 1 represents a system 105 for use in identifying an EV charger with a first dynamic QR code and a second dynamic QR code being distinct and presented on an EV charger screen at different points in time in accordance with an embodiment of the present disclosure. FIG. 1 illustrates an Open Charge Point Protocol (OCPP) 107 that enables communication between an electric vehicle (EV) 110, a charge point (EV Charger) 112, and an OCPP backend system 115 in accordance with an embodiment of the present disclosure.

The Open Charge Point Protocol (OCPP) 107 is an application protocol that allows communication between EV charging stations and a central management system. OCPP 107 plays a vital role in efficient charge station communication and management. OCPP-compliant chargers send data in the same format as defined in the OCPP documentation, which includes energy data, start/stop information, and error codes. Charging software that follows the OCPP standard receives this data and can create graphs, tables, or notifications to ensure high uptime. OCPP 107 is an open-source protocol that allows communication and management of EV charging infrastructure. It enables interoperability between different EV charging equipment and central management systems. Open Charge Point Interface (OCPI) is an open communication protocol that makes it easier for EV drivers to find and use charging stations. OCPI enhances user accessibility and interoperability across different networks. OCPI supports the communication of CP location, accessibility, and pricing.

An OCPP client (EV charger 112) and an OCPP server 120 exchange general information, such as meter values. These messages coordinate the charging experience between hardware and software, ensuring proper authorization, load management, energy dispensation, and more.

WebSockets are a bidirectional, full duplex communications protocol that are commonly used in modern web applications for streaming data and other asynchronous traffic. They are initiated over HTTP and establish a WebSocket over an encrypted TLS connection. WebSocket connections are typically long-lived, meaning messages can be sent in either direction at any time and are not transactional in nature. The connection between client and server will keep alive until it is terminated by either party. For example, the WebSocket Secure (WSS) URL is a uniform resource identifier (URI) scheme that identifies a WebSocket secure connection. The WebSocket protocol specification defines ws (WebSocket) and wss (WebSocket Secure) as two different URI schemes, with ws being unencrypted and wss being encrypted.

Figure 2:
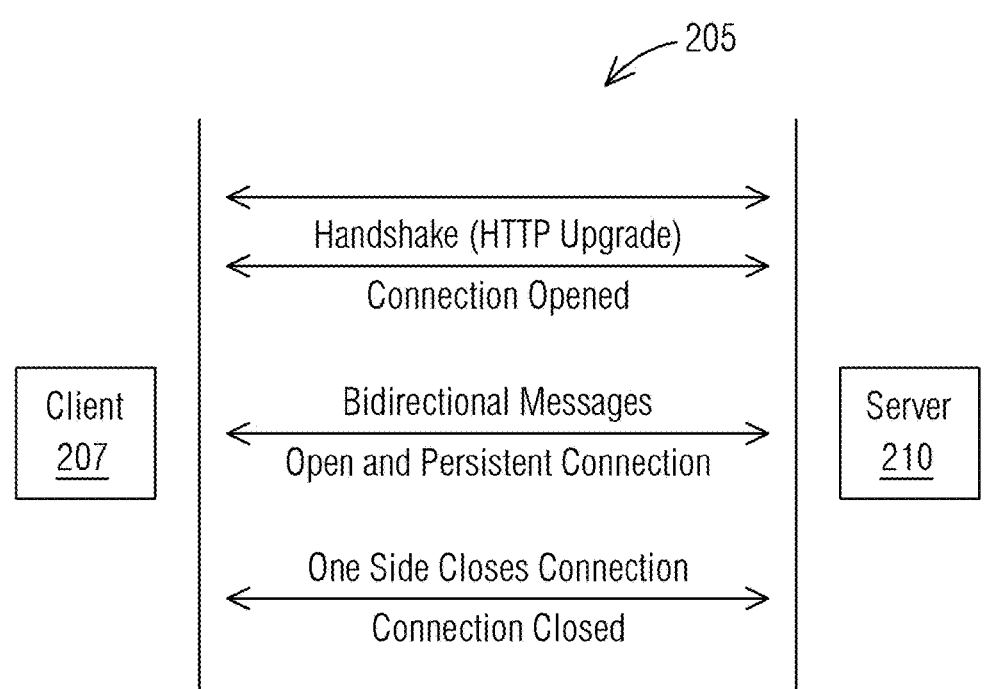
FIG. 2 illustrates a computer communications protocol that allows for two-way communication between a client and a server over a single connection in accordance with an embodiment of the present disclosure.

Referring to FIG. 2, it illustrates a computer communications protocol 205 that allows for a two-way communication between a client 207 and a server 210 over a single connection in accordance with an embodiment of the present disclosure.

Figure 3:
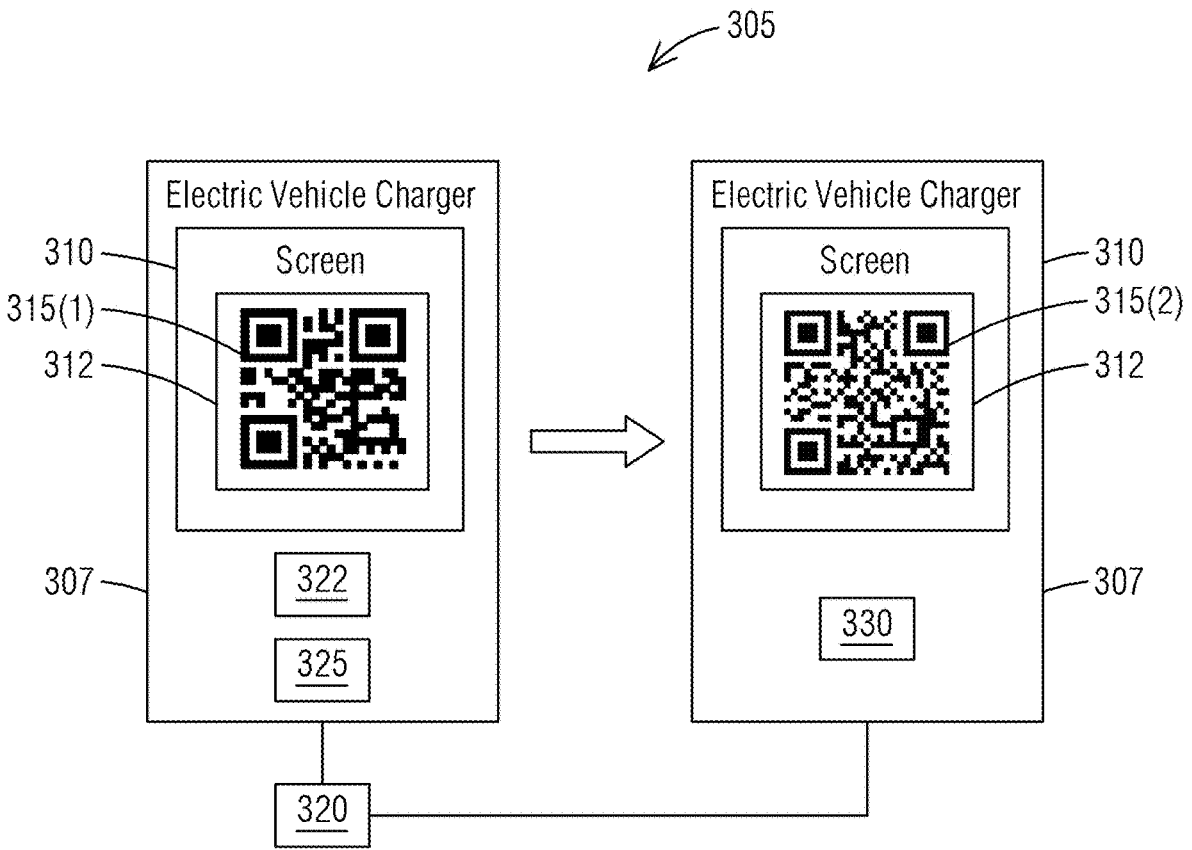
FIG. 3 illustrates a system comprising an Electric Vehicle (EV) charger with an electronic display screen having an e-ink display, a first dynamic Quick-Response code (QR code) and a second dynamic QR code in accordance with an embodiment of the present disclosure.

Turning now to FIG. 3, it illustrates a system 305 comprising an Electric Vehicle (EV) charger 307 with an electronic display screen 310 having an e-ink display 312, a first dynamic Quick-Response code (OR code) 315(1) and a second dynamic OR code 315(2) in accordance with an embodiment of the present disclosure. The system 305 comprises an Open Charge Point Protocol (OCPP) backend system 320 that receives charging data and sends charging commands based on dynamic load management principles via communication between chargers and central back-end EV charging management systems. The first dynamic Quick-Response code (QR code) 315(1) represents the EV charger 307 for the purposes of charger commissioning and configuration and is presented on the e-ink display 312 during a boot time 322, and during (re-)configuration time whenever the EV charger 307 is placed in a (re-)configuration mode 325. The second dynamic OR code 315(2) different from the first dynamic OR code 315(1) is related to the OCPP backend system 320 to which the EV charger 307 is connected is presented on the e-ink display 312 during an operational time 330.

If the e-ink display 312 of the electronic display screen 310 used in the EV charger 307 also called an electronic paper (e-paper) screen, when power is out the first dynamic OR code 315(1) of the EV charger 307 during commissioning/configuration is displayed on the e-paper screen. The EV charger 307 displays a variable OR code on the e-paper screen that is used for configuration/commissioning or operation at different points in time. The EV charger 307 avoids confusion of both an end user as well as a service personnel operating and servicing the EV charger 307. The first dynamic OR code 315(1) and the second dynamic OR code 315(2) are used to identify the EV charger 307. The first dynamic OR code 315(1) and the second dynamic OR code 315(2) cannot be used to attack a driver trying to charge her/his electric vehicle (EV) as dynamic OR codes have an advantage of being harder to hack via placement of a paper OR code on top. One dynamic OR code is created by the OCPP backend system 320, and another dynamic OR code is created by a platform used to configure the EV charger 307.

There are two different states:

a) the EV charger 307 is booting (or powered off, if the charger display is of the e-ink display that allows displaying static information on the electronic display screen when there is no power): in this case the first dynamic OR code 315(1) with information needed for configuring the EV charger 307/installing the EV charger 307 is displayed such that an installer would use an installer app on a cellphone, in order to scan the first dynamic OR code 315(1) and configure the EV charger 307; and b) the EV charger 307 is no longer booting, and now is ready for operation (including a possible delay after boot time, to allow installers to configure the EV charger 307): now the second dynamic OR code 315(2) displayed is an operational OR code, different, that if scanned by a driver with a phone, will take the driver to a landing page associated with operating the EV charger 307 (paying for a charging session, starting to charger, stopping to charger, etc.).

The first dynamic OR code 315(1) is equivalent to a charger serial number in a format ABCD1234567890. The second dynamic OR code 315(2) is equivalent to a URL (https://OCPPServerURL.com/ABCD1234567890) used by drivers, that allows them to access an operations screen presented by an OCPP server to which the EV charger 307 is connected.

FIG. 4 illustrates a first dynamic OR code 415 in accordance with an embodiment of the present disclosure. The first dynamic OR code 415 is displayed on a screen 405 of an EV charger 407.

As seen in FIG. 5, it illustrates a second dynamic OR code 515 in accordance with an embodiment of the present disclosure. The second dynamic OR code 515 is displayed on a screen 505 of an EV charger 507.

As shown in FIG. 6, it illustrates a method 600 of providing two distinct dynamic QR codes on a screen of an EV charger in accordance with an embodiment of the present disclosure. Reference is made to the elements and features described in FIGS. 1-5. It should be appreciated that some steps are not required to be performed in any particular order, and that some steps are optional.

The method 600 comprises a step 605 of providing an Electric Vehicle (EV) charger with an electronic display screen having an e-ink display. The method 600 further comprises a step 610 of providing an Open Charge Point Protocol (OCPP) backend system that receives charging data and sends charging commands based on dynamic load management principles via communication between chargers and central back-end EV charging management systems. The method 600 further comprises a step 615 of providing the first dynamic Quick-Response code (OR code) 415 representing the EV charger 407 for the purposes of charger commissioning and configuration is presented on the e-ink display during a boot time, and during (re-)configuration time whenever the EV charger is placed in a (re-) configuration mode. The method 600 further comprises a step 620 of providing the second dynamic OR code 515 different from the first dynamic OR code 415 related to the OCPP backend system to which the EV charger 407/507 is connected is presented on the e-ink display during an operational time.

While two distinct dynamic OR codes on a screen of an EV charger-based system is described here a range of one or more other systems are also contemplated by the present disclosure. For example, other systems based on a single dynamic OR code may be implemented based on one or more features presented above without deviating from the spirit of the present disclosure.

The techniques described herein can be particularly useful for an Open Charge Point Protocol (OCPP) backend system. While particular embodiments are described in terms of the OCPP protocol, the techniques described herein are not limited to such a specific protocol but can also be used with other number of protocols.

While embodiments of the present disclosure have been disclosed in exemplary forms, it will be apparent to those skilled in the art that many modifications, additions, and deletions can be made therein without departing from the spirit and scope of the disclosure and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the disclosure has been described with reference to specific embodiments. However, one of ordinary skill in the art appreciates that various modifications and changes can be made without departing from the scope of the disclosure. Accordingly, the specification and figures are to be regarded in an illustrative rather than a restrictive sense, and all such modifications are intended to be included within the scope of disclosure.

Although the disclosure has been described with respect to specific embodiments thereof, these embodiments are merely illustrative, and not restrictive of the disclosure. The description herein of illustrated embodiments of the disclosure is not intended to be exhaustive or to limit the disclosure to the precise forms disclosed herein (and in particular, the inclusion of any particular embodiment, feature or function is not intended to limit the scope of the disclosure to such embodiment, feature or function). Rather, the description is intended to describe illustrative embodiments, features and functions in order to provide a person of ordinary skill in the art context to understand the disclosure without limiting the disclosure to any particularly described embodiment, feature or function. While specific embodiments of, and examples for, the disclosure are described herein for illustrative purposes only, various equivalent modifications are possible within the spirit and scope of the disclosure, as those skilled in the relevant art will recognize and appreciate. As indicated, these modifications may be made to the disclosure in light of the foregoing description of illustrated embodiments of the disclosure and are to be included within the spirit and scope of the disclosure. Thus, while the disclosure has been described herein with reference to particular embodiments thereof, a latitude of modification, various changes and substitutions are intended in the foregoing disclosures, and it will be appreciated that in some instances some features of embodiments of the disclosure will be employed without a corresponding use of other features without departing from the scope and spirit of the disclosure as set forth. Therefore, many modifications may be made to adapt a particular situation or material to the essential scope and spirit of the disclosure.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the disclosure.

In the description herein, numerous specific details are provided, such as examples of components and/or methods, to provide a thorough understanding of embodiments of the disclosure. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the disclosure. While the disclosure may be illustrated by using a particular embodiment, this is not and does not limit the disclosure to any particular embodiment and a person of ordinary skill in the art will recognize that additional embodiments are readily understandable and are a part of this disclosure.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

The invention claimed is:

1. A system comprising:
   an Electric Vehicle (EV) charger with an electronic display screen having an e-ink display;
   an Open Charge Point Protocol (OCPP) backend system that receives charging data and sends charging commands based on dynamic load management principles via communication between chargers and central backend EV charging management systems;
   a first dynamic Quick-Response code (QR code) representing the EV charger for the purposes of charger commissioning and configuration is presented on the e-ink display during a boot time, and during (re-)configuration time whenever the EV charger is placed in a (re-)configuration mode; and
   a second dynamic QR code different from the first dynamic QR code related to the OCPP backend system to which the EV charger is connected is presented on the e-ink display during an operational time.

2. The system of claim 1, wherein if the e-ink display of the electronic display screen used in the EV charger also called an electronic paper (e-paper) screen, when power is out the first dynamic QR code of the EV charger during commissioning/configuration is displayed on the e-paper screen.

3. The system of claim 2, wherein the EV charger displays a variable QR code on the e-paper screen that is used for configuration/commissioning or operation at different points in time.

4. The system of claim 1, wherein the EV charger avoids confusion of both an end user as well as a service personnel operating and servicing the EV charger.

5. The system of claim 1, wherein the first dynamic QR code and the second dynamic QR code are used to identify the EV charger.

6. The system of claim 5, wherein the first dynamic QR code and the second dynamic QR code cannot be used to attack a driver trying to charge her/his electric vehicle (EV) as dynamic QR codes have an advantage of being harder to hack via placement of a paper QR code on top.

7. The system of claim 6, wherein one dynamic QR code is created by the OCPP backend system, and another dynamic QR code is created by a platform used to configure the EV charger.

8. The system of claim 1, wherein there are two different states:
   a) the EV charger is booting (or powered off, if the charger display is of the e-ink display that allows displaying static information on the electronic display screen when there is no power): in this case the first dynamic QR code with information needed for configuring the EV charger/installing the EV charger is displayed such that an installer would use an installer app on a cellphone, in order to scan the first dynamic QR code and configure the EV charger; and b) the EV charger is no longer booting, and now is ready for operation (including a possible delay after boot time, to allow installers to configure the EV charger): now the second dynamic QR code displayed is an operational QR code, different, that if scanned by a driver with a phone, will take the driver to a landing page associated with operating the EV charger (paying for a charging session, starting to charger, stopping to charger, etc.).

9. The system of claim 1, wherein the first dynamic QR code is equivalent to a charger serial number in a format ABCD1234567890.

10. The system of claim 9, wherein the second dynamic QR code is equivalent to a URL (https://OCPPServerURL-.com/ABCD1234567890) used by drivers, that allows them to access an operations screen presented by an OCPP server to which the EV charger is connected.

11. A method comprising:

providing an Electric Vehicle (EV) charger with an electronic display screen having an e-ink display;

providing an Open Charge Point Protocol (OCPP) backend system that receives charging data and sends charging commands based on dynamic load management principles via communication between chargers and central back-end EV charging management systems;

providing a first dynamic Quick-Response code (QR code) representing the EV charger for the purposes of charger commissioning and configuration is presented on the e-ink display during a boot time, and during (re-)configuration time whenever the EV charger is placed in a (re-)configuration mode; and providing a second dynamic QR code different from the first dynamic QR code related to the OCPP backend system to which the EV charger is connected is presented on the e-ink display during an operational time.

12. The method of claim 11, wherein if the e-ink display of the electronic display screen used in the EV charger also called an electronic paper (e-paper) screen, when power is out the first dynamic QR code of the EV charger during commissioning/configuration is displayed on the e-paper screen.

13. The method of claim 12, wherein the EV charger displays a variable QR code on the e-paper screen that is used for configuration/commissioning or operation at different points in time.

14. The method of claim 11, wherein the EV charger avoids confusion of both an end user as well as a service personnel operating and servicing the EV charger.

15. The method of claim 11, wherein the first dynamic QR code and the second dynamic QR code are used to identify the EV charger.

16. The method of claim 15, wherein the first dynamic QR code and the second dynamic QR code cannot be used to attack a driver trying to charge her/his electric vehicle (EV) as dynamic QR codes have an advantage of being harder to hack via placement of a paper QR code on top.

17. The method of claim 16, wherein one dynamic QR code is created by the OCPP backend system, and another dynamic QR code is created by a platform used to configure the EV charger.

18. The method of claim 11, wherein there are two different states:

a) the EV charger is booting (or powered off, if the charger display is of the e-ink display that allows displaying static information on the electronic display screen when there is no power): in this case the first dynamic QR code with information needed for configuring the EV charger/installing the EV charger is displayed such that an installer would use an installer app on a cellphone, in order to scan the first dynamic QR code and configure the EV charger; and b) the EV charger is no longer booting, and now is ready for operation (including a possible delay after boot time, to allow installers to configure the EV charger): now the second dynamic QR code displayed is an operational QR code, different, that if scanned by a driver with a phone, will take the driver to a landing page associated with operating the EV charger (paying for a charging session, starting to charger, stopping to charger, etc.).

19. The method of claim 11, wherein the first dynamic QR code is equivalent to a charger serial number in a format ABCD1234567890.

20. The method of claim 19, wherein the second dynamic QR code is equivalent to a URL (https://OCPPServerURL-.com/ABCD1234567890) used by drivers, that allows them to access an operations screen presented by an OCPP server to which the EV charger is connected.

* * * * *